United States Patent
Chandramohan et al.

(10) Patent No.: US 12,436,745 B2
(45) Date of Patent: Oct. 7, 2025

(54) DEVELOPING A PROGRAMMING LANGUAGE MODEL FOR MACHINE LEARNING TASKS

(71) Applicant: Oracle International Corporation, Redwood Shores, CA (US)

(72) Inventors: Mahinthan Chandramohan, Brisbane (AU); Behnaz Hassanshahi, Brisbane (AU); Padmanabhan Krishnan, Brisbane (AU); Dai Nguyen, Kelvin Grove (AU)

(73) Assignee: Oracle International Corporation, Redwood Shores, CA (US)

( * ) Notice: Subject to any disclaimer, the term of this patent is extended or adjusted under 35 U.S.C. 154(b) by 194 days.

(21) Appl. No.: 18/382,018

(22) Filed: Oct. 19, 2023

(65) Prior Publication Data

US 2025/0130780 A1    Apr. 24, 2025

(51) Int. Cl.
*G06F 8/35* (2018.01)
*G06F 40/284* (2020.01)
*G06F 40/30* (2020.01)

(52) U.S. Cl.
CPC .............. *G06F 8/35* (2013.01); *G06F 40/284* (2020.01); *G06F 40/30* (2020.01)

(58) Field of Classification Search
CPC ............ G06F 8/35; G06F 40/284; G06F 40/30
USPC ......................................................... 717/104
See application file for complete search history.

(56) References Cited

U.S. PATENT DOCUMENTS

| | | | | |
|---|---|---|---|---|
| 11,429,352 B2* | 8/2022 | Pujar | ........................ | G06F 40/40 |
| 11,562,142 B2* | 1/2023 | Nijkamp | .................. | G06F 40/35 |
| 11,893,347 B2* | 2/2024 | Klein | ...................... | G06F 40/30 |
| 12,249,252 B1* | 3/2025 | Ghosh | ................... | G06F 40/284 |
| 12,361,215 B2* | 7/2025 | Wei | ........................ | G06F 40/284 |
| 2020/0312301 A1* | 10/2020 | Polovets | ................ | G06N 3/084 |
| 2022/0107828 A1* | 4/2022 | Mostafa | .................... | G06F 8/73 |
| 2022/0245350 A1* | 8/2022 | Ormerod | ................ | G06N 3/045 |

OTHER PUBLICATIONS

Liu, Fang, et al. "Multi-task learning based pre-trained language model for code completion." Proceedings of the 35th IEEE/ACM international conference on automated software engineering. 2020. pp. 473-483. (Year: 2020).*

(Continued)

*Primary Examiner* — Satish Rampuria
(74) *Attorney, Agent, or Firm* — Lathrop GPM LLP (57) ABSTRACT

A method develops a programming language model for machine learning tasks. The method includes adjusting a token list to include a language token used by a tokenizer for a pretrained language model. The pretrained language model includes a set of layers. The set of layers includes a set of initial layers, an embedding layer, and an output layer. The method further includes performing an output layer modification of the output layer to replace the output vector with the embedding vector. The method further includes freezing the set of initial layers to generate a set of frozen layers of the pretrained language model that do not update during training. The method further includes training the pretrained language model using the language token, the output layer modification, and the set of frozen layers to form a fine-tuned model from the pretrained language model.

20 Claims, 5 Drawing Sheets

(56) References Cited

OTHER PUBLICATIONS

Feng, Zhangyin, et al. "Codebert: A pre-trained model for programming and natural languages." arXiv preprint arXiv:2002.08155 (2020). pp. 1-12. (Year: 2020).*

Gururangan, Suchin, et al. "Don't stop pretraining: Adapt language models to domains and tasks." arXiv preprint arXiv:2004. 10964 (2020). pp. 1-19. (Year: 2020).*

Dehaerne, Enrique, et al. "Code generation using machine learning: A systematic review." Ieee Access 10 (2022): pp. 82434-82455. (Year: 2022).*

Perez, Luis, Lizi Ottens, and Sudharshan Viswanathan. "Automatic code generation using pre-trained language models." arXiv preprint arXiv:2102.10535 (2021). pp. 1-9. (Year: 2021).*

Rahmani, Kia, et al. "Multi-modal program inference: a marriage of pre-trained language models and component-based synthesis." Proceedings of the ACM on Programming Languages 5.OOPSLA (2021): pp. 158:1-158:29. (Year: 2021).*

Ahmadi, M. et al., "Finding bugs using your own code: Detecting functionally-similar yet inconsistent code", In USENIX Security Symposium, pp. 2025-2040, Aug. 11-13, 2021 (17 pages).

Al-Omari, F. et al., "SemanticCloneBench: A semantic code clone benchmark using crowd-source knowledge", In IEEE 14th International Workshop on Software Clones (IWSC), pp. 57-63, Feb. 1, 2020 (7 pages).

Devlin, J. et al., "BERT: Pretraining of deep bidirectional transformers for language understanding", arXiv preprint arXiv:1810. 04805, May 24, 2019 (16 pages).

Feng, Z. et al., "CodeBERT: A pre-trained model for programming and natural languages", In Findings of EMNLP, pp. 1536-1547, Nov. 16-20, 2020 (12 pages).

Guo, D. et al., "UniXcoder: Unified cross-modal pre-training for code representation" arXiv preprint arXiv:2203.03850, Mar. 8, 2022 (14 pages).

Guo, D. et al., Graphcodebert: Pre-training code representations with data flow. In ICLR, Sep. 13, 2021 (18 pages).

Hochreiter, S. et al., "Long short-term memory", Neural Computation, 9:1735-1780, Nov. 15, 1997 (32 pages).

Husain, H., et al., "Codesearchnet challenge: Evaluating the state of semantic code search", arXiv preprint arXiv:1909.09436, Jun. 8, 2020 (6 pages).

Kim, Y. "Convolutional neural networks for sentence classification" In EMNLP, pp. 1746-1751, Oct. 25-29, 2014 (6 pages).

Kipf, T. N. et al., "Semi-supervised classification with graph convolutional networks" In ICLR, Feb. 22, 2017 14 pages).

Kim, S. et al., "Vuddy: A scalable approach for vulnerable code clone discovery", In IEEE Symposium on Security and Privacy, May 22-26, 2017 (20 pages).

Liu, Y. et al., RoBERTa: A robustly optimized bert pretraining approach. arXiv preprint arXiv:1907.11692, Jul. 26, 2019 (13 pages).

Li, Y. et al., "Gated Graph Sequence Neural Networks", In ICLR, Sep. 22, 2017 (20 pages).

Li, Y. et al., Do pre-trained language models indeed understand software engineering tasks? arXiv:2211.10623, Nov. 19, 2022 (16 pages).

Li, Z. et al., "VulDeePecker: A deep learning-based system for vulnerability detection", arXiv preprint arXiv:1801.01681, Jan. 5, 2018 (15 pages).

Vandermaaten, L. et al., "Visualizing Data using t-SNE", Journal of machine learning research, pp. 2579-2605, Nov. 1, 2008 (27 pages).

Mou, L. et al., "Convolutional neural networks over tree structures for programming language processing", In AAAI, Dec. 5, 2015 (8 pages).

Neuhaus, S. et al., "Predicting vulnerable software components", In ACM CCS, pp. 529-540, Oct. 29, 2007 (12 pages).

Ren, S. et al., "CodeBLEU: a method for automatic evaluation of code synthesis" arXiv preprint arXiv:2009.10297, Sep. 27, 2020 (8 pages).

Russell, R. et al., "Automated vulnerability detection in source code using deep representation learning", In ICMLA, Dec. 1, 2018 (6 pages).

Sennrich, R. et al., "Neural machine translation of rare words with subword units", In ACL, pp. 1715-1725, Aug. 7-12, 2016 (11 pages).

Svajlenko, J. et al., "Towards a big data curated benchmark of inter-project code clones", In ICSME, pp. 476-480, Jan. 1, 2014 (5 pages).

Shin, Y. et al., "Evaluating complexity, code churn, and developer activity metrics as indicators of software vulnerabilities", IEEE Transactions on Software Engineering, 37, Mar. 18, 2009 (34 pages).

Woo, S. et al., "Movery: A precise approach for modified vulnerable code clone discovery from modified open-source software components", In USENIX Security Symposium, pp. 3037-3053, Aug. 10-12, 2022 (18 pages).

Wang, W. et al., "Detecting code clones with graph neural network and flow-augmented abstract syntax tree", In SANER, pp. 261-271, Feb. 20, 2020 (11 pages).

White, M. et al., "Deep learning code fragments for code clone detection", In ASE, pp. 87-98, Sep. 3-7, 2016 (12 pages).

Wan, Y. et al., "What do they capture?—A structural analysis of pre-trained language models for source code", In CSE, Feb. 14, 2022 (12 pages).

Zhao, G. et al., "Deepsim: deep learning code functional similarity", In ESEC/FSE, pp. 141-151, Oct. 1, 2018 (11 pages).

Zhou, Y. et al., "Devign: Effective vulnerability identification by learning comprehensive program semantics via graph neural networks", In NeurIPS, Sep. 8, 2019 (11 pages).

Zhang, Y. et al., "ASTRO: An AST-assisted approach for generalizable neural clone detection", In Proceedings of Automated Software Engineering Industrial Showcase (ASE), Aug. 17, 2022 (5 pages).

* cited by examiner

```
public class AsciiValue { public static void main(String[] args) { char ch = 'a';
        int ascii = ch;
        // You can also cast char to int
        int castAscii = (int) ch;

System.out.println("The ASCII value of " + ch + " is: " + ascii);
        System.out.println("The ASCII value of " + ch + " is: " + castAscii);
    }
} what does the code above do?
```

401

PRETRAINED LANGUAGE MODEL 403

The code sets values for the variables ascii and castAscii and calls System.out.println with the variables.

405

FINE TUNED MODEL 423

The code calculates and displays the ASCII value of the character 'a' in two different ways by converting the character to its corresponding ASCII integer value and by using explicit casting.

DEVELOPING A PROGRAMMING LANGUAGE MODEL FOR MACHINE LEARNING TASKS

BACKGROUND

A programming language model is a machine learning model that is developed to comprehend and produce code across a range of programming languages. Programming language models undergo training on extensive code repositories to learn language syntax, semantics, and coding patterns.

Programming language models may create code snippets, functions, or even entire programs based on provided descriptions. Secondly, programming language models may also provide intelligent suggestions for code completion to enhance coding efficiency and accuracy and be capable of detecting potential bugs or errors in code to suggest fixes. Programming language models may facilitate code translation from one programming language to another while retaining functionality of the original code. Programming language models may contribute to documentation generation by comprehending code purpose and functionality and provide insights and recommendations for refactoring code, thereby enhancing structure, readability, and maintainability of the code.

A challenge with using a programming language model is that the programming language model may not understand the context or intricacies of the programming language being used. Without this understanding, output from the programming language model may be incorrect or may not align with the input.

SUMMARY

In general, in one or more aspects, the disclosure relates to a method that develops a programming language model for machine learning tasks. The method includes adjusting a token list to include a language token used by a tokenizer for a pretrained language model. The pretrained language model includes a set of layers. The set of layers includes a set of initial layers, an embedding layer, and an output layer. The output layer generates an output vector from an embedding vector generated by the embedding layer. The method further includes performing an output layer modification of the output layer to replace the output vector with the embedding vector. The method further includes freezing the set of initial layers to generate a set of frozen layers of the pretrained language model that do not update during training. The method further includes training the pretrained language model using the language token, the output layer modification, and the set of frozen layers to form a fine-tuned model from the pretrained language model.

In general, in one or more aspects, the disclosure relates to a system that develops a programming language model for machine learning tasks. The system includes at least one processor and an application executing on the at least one processor. The application performs adjusting a token list to include a language token used by a tokenizer for a pretrained language model. The pretrained language model includes a set of layers. The set of layers includes a set of initial layers, an embedding layer, and an output layer. The output layer generates an output vector from an embedding vector generated by the embedding layer. The application further implements performing an output layer modification of the output layer to replace the output vector with the embedding vector. The application further performs freezing the set of initial layers to generate a set of frozen layers of the pretrained language model that do not update during training. The application further performs training the pretrained language model using the language token, the output layer modification, and the set of frozen layers to form a fine-tuned model from the pretrained language model.

In general, in one or more aspects, the disclosure relates to a non-transitory computer readable storage medium storing computer readable program code executable by a processor to develops a programming language model for machine learning tasks. The executable code performs adjusting a token list to include a language token used by a tokenizer for a pretrained language model. The pretrained language model includes a set of layers. The set of layers includes a set of initial layers, an embedding layer, and an output layer. The output layer generates an output vector from an embedding vector generated by the embedding layer. The executable code further implements performing an output layer modification of the output layer to replace the output vector with the embedding vector. The executable code further performs freezing the set of initial layers to generate a set of frozen layers of the pretrained language model that do not update during training. The executable code further performs training the pretrained language model using the language token, the output layer modification, and the set of frozen layers to form a fine-tuned model from the pretrained language model.

Other aspects of the one or more embodiments will be apparent from the following description and the appended claims.

BRIEF DESCRIPTION OF DRAWINGS

Like elements in the various figures are denoted by like reference numerals for consistency.

DETAILED DESCRIPTION

Embodiments of the disclosure address the issues of programming language models not understanding the context of programming languages by developing programming language models for machine learning tasks. Contextual understanding of programming language, as measured by the accuracy of the output of a pretrained language model, may be improved by adjusting the tokenization of the input to a language model, modifying the output of the pretrained language model, and freezing certain layers of the pretrained language model while retraining the pretrained language model.

Figure 1:
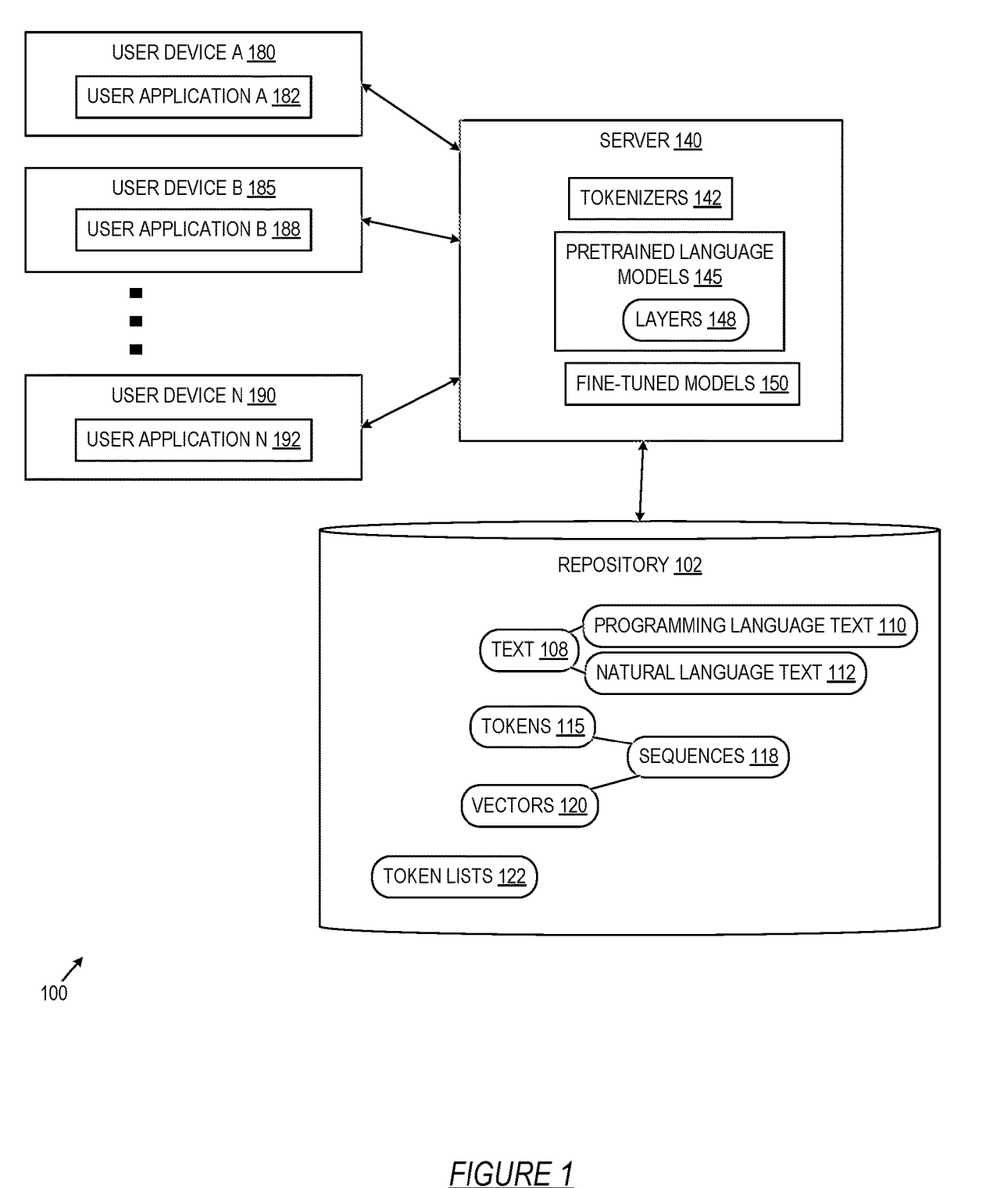
FIG. 1 shows a computing system, in accordance with one or more embodiments of the disclosure.

Turning to FIG. 1, the system (100) is a computing system shown in accordance with one or more embodiments. The system (100) and corresponding components may utilize the computing systems described in FIGS. 5A and 5B to develop programming language models for machine learning tasks. Different architectures may be used. The system (100) includes the repository (102), the server (140), and the user devices A (180) and B (185) through N (190).

The repository (102) is a type of storage unit and/or device (e.g., a file system, database, data structure, or any other storage mechanism) for storing data. The repository (102) may include multiple different, potentially heterogeneous, storage units and/or devices. The repository (102) stores data utilized by other components of the system (100). The data stored by the repository (102) includes the text (108), the programming languages (110), the natural languages (112), the tokens (115), the sequences (118), the vectors (120), and the token lists (122).

The text (108) are strings of character data. The text (108) includes words and sentences that are used as input data for training and inference of the pretrained language models (145) and the fine-tuned models (150). The text (108) is composed of textual information, such as written or typed language, and may be represented in a structured format that can be processed by the machine learning models utilized by the system (100). The text (108) includes text data that may be used for various natural language processing (NLP) tasks, including text classification, sentiment analysis, machine translation, etc., and for programming language tasks including code summarization, programming suggestions, commenting, etc. The text (108) may include prompts input to the machine learning models utilized by the system (100). In one or more embodiments, the text (108) includes a data set for fine tuning the pretrained language models (145) to generate the fine-tuned models (150). The text (108) may include the programming language text (110) and the natural language text (112).

The programming language text (110) are portions of the text (108) that are written in accordance with a programming language. Programming languages are sets of instructions and rules that allow users to write software programs that are a sequence of commands and logic that tell a computer how to perform specific tasks or solve particular problems. Programming languages provide a human-readable and understandable format, which may then be translated into machine code that the computer can execute. The programming language text (110) may include a series of instructions and statements written in a specific syntax of a particular programming language.

The natural language text (112) are portions of the text (108) that are written in natural language. Natural language refers to human language as it is spoken and written by people in everyday communication and encompasses the languages and expressions that humans use to convey information. Natural language is characterized by complexity, variability, and rich structures of grammar, syntax, and semantics. The natural language text (112) is stored as text or character data and may be in accordance languages including English, Spanish, Chinese, French, German, Japanese, etc. The natural language text (112) may include unstructured data that is nonnumerical and be mixed in with structured data and numeric data.

The tokens (115) are the individual units or elements that the text (108) is divided into for analysis. The tokens (115) are portions of the text (108) broken down into smaller components, which may be words or subword units. As an example, the sentence "I love machine learning" may be tokenized into three tokens: "I," "love," and "machine learning." Subword tokenization can break down words into smaller units like "subwords" (e.g., "learn" and "ing") or "byte-pair encodings" (e.g., "lo" and "ve") to handle additional concepts and improve efficiency. Punctuation marks and special characters like commas, periods, and question marks may be treated as separate tokens during tokenization. In one or more embodiments, a token may be represented by a unique identifier that may be a scaler value.

The sequences (118) are the inputs to the pretrained language models (145) and the fine-tuned models (150). The sequences (118) are ordered sets of individual tokens (115) or vectors (120). The sequences (118) may be sequences of the tokens (115) or corresponding vectors (120). For example, one sequence may be a sequence of tokens that is mapped to a corresponding sequence of vectors in which a vector is a representation of a token. The sequences (118) may have variable lengths that are accounted for by padding or truncation to input a sequence to a machine learning model.

The vectors (120) are representations of the tokens (115). In one or more embodiments, the vectors (120) may include embedded vectors (mapped from the tokens (115), encoded vectors (generated using an encoder machine learning model from the tokens or embedded vectors), input vectors (input to the pretrained language models (145) or the fine-tuned models (150)), intermediate vectors (generated within the models of the system (100)), output vectors (output from the pretrained language models (145) or the fine-tuned models (150)), etc. The vectors capture semantic relationships and contextual information between the tokens (115) to map the tokens (115) to a semantic vector space in which tokens (e.g., words) located at similar points in the semantic vector space have similar meaning.

The token lists (122) are the lists of tokens used as libraries by the tokenizers (142). A token list identifies the tokens that may be identified from the text (108) to form the tokens (115). The token lists (122) may include tokens for terms from the programming language text (110) and terms from the natural language text (112).

Continuing with FIG. 1, the system (100) also may include the server (140). The server (140) is one or more computing systems, possibly in a distributed computing environment. An example of the server (140) may be the computing system shown in FIG. 5A.

The server (140) may host and/or execute one or more processes, software, applications, etc. For example, the server (140) may execute the tokenizers (142), the pretrained language models (145), and the fine-tuned models (150). Different embodiments may include and execute the tokenizers (142), the pretrained language models (145), and the fine-tuned models (150) using different computing systems and servers. The server (140) may interact with the user devices A (180) and B (185) through N (190) to process machine learning tasks and training.

The tokenizers (142) are the hardware and software components of the server (140) that break down the text (108) to the tokens (115). The tokenizers (142) use the token lists (122) to identify the tokens (115) from the text (108). One of the tokenizers (142) may be used with multiple ones of the pretrained language models (145).

The pretrained language models (145) are machine learning models used by the system (100) to process the tokens (115) and vectors (120). The system (100) may fine-tune multiple pretrained language models (145). The pretrained language models (145) have been trained on a large corpus of pretraining text data before being fine-tuned to predict words in sentences from the pretraining text data. Each of the pretrained language models (145) includes a set of layers, which may include including the layers (148) for one of the pretrained language models (145). The pretrained language models (145) are artificial intelligence models that focuses on the comprehension and generation of the text (108), including the natural language text (112) and the programming language text (112). The pretrained language models (145) may perform tasks specified in the text (108) that are input to the pretrained language models (145). The pretrained language models (145) may include transformer models utilizing multiple transformer layers to process text, tokens, vectors, etc. In one or more embodiments, the pretrained language models (145) may include programming language models that are trained with programming language text to perform tasks utilizing programming language text. In one or more embodiments, the pretrained language models (145) may include large language models that include many transformer layers (e.g., hundreds to thousands, or more) that are trained to perform tasks utilizing text of one or more different types of languages, including different human languages, different programming languages, etc.

The layers (148), of one of the pretrained language models (145), process and analyze data, extract patterns, and make predictions or decisions. The layers (148) form a hierarchical structure that transforms input data into meaningful output data. Different architectures, numbers, and types of layers may be used for the different pretrained language models (145). Each of the layers (148) receives a sequence of vectors as input and outputs a sequence of vectors, which may be stored to the repository (102). The different types of layers are described below.

An input layer is the starting point of a machine learning model. An input layer receives the raw data or features that the pretrained language model will process. The data type input to the input layer corresponds to the type of data being input, e.g., text or the tokens and vectors generated therefrom.

Hidden layers are intermediate layers between input layers and output layers. Hidden layers are where the pretrained language models (145) learn complex representations and patterns within the data. The number of hidden layers and the number of neurons (nodes) in each layer may be different between the different pretrained language models (145). The hidden layers and, optionally, other layers, may include activation functions, weights, biases, etc.

Activation functions are applied to the output of neurons of hidden layers to introduce non-linearity into the model and provide for modeling complex relationships in the data. Example activation functions include the rectified linear unit (ReLU) and sigmoid functions.

Weights and biases are used for the connections between neurons of different ones of the layers (148). The weights and biases are parameters that are learned during training to adjust the strength of connections (weights) and biases in the model. The weights and biases determine how input data is transformed as it passes through the layers.

Loss functions, also known as objective functions, measure the difference between the predictions of a model and the values expected from the model. During training, output from the loss function is minimized to guide adjustments to the parameters of the layers (148) of the pretrained language models (145).

Optimization algorithms, such as stochastic gradient descent (SGD) or Adam, are used to update the weights and biases of the pretrained language models (145) during training. Optimization algorithms are used to find the values that minimize the loss function.

An output layer produces the final predictions or classifications for a model. The structure of the output layer may be different for the different pretrained language models (145).

The fine-tuned models (150) may be versions of the pretrained language models (145) that have been "fine-tuned" through additional modification and training. The fine-tuned models (150) may start from pretrained or pre-existing models (i.e., the pretrained language models (145)) and that are further trained on a smaller, task-specific dataset to adapt the pretrained models to a particular use case or domain. Fine-tuning is a transfer learning technique for machine learning models that involve multiple steps.

In one or more embodiments, fine-tuning starts with a pretrained model that has been trained on a large and diverse dataset for a general task, such as natural language modeling, programming language modeling, image classification, etc. The pretrained models have already learned weights and biases for features and representations from the input data.

To fine-tune a model for a specific task or domain, a smaller dataset that is relevant to the target task is used to further train the pretrained model. The smaller dataset may contain labeled examples or data associated with the task for the model to perform. For example, fine-tuning a language model for sentiment analysis may have the smaller data set include text samples labeled with sentiment labels (e.g., positive, negative, neutral, etc.).

Continuing with FIG. 1, the user devices A (180) and B (185) through N (190) may interact with the server (140). The user devices A (180) and B (185) through N (190) may be computing systems in accordance with FIGS. 5A and 5B. The user devices A (180) and B (185) through N (190) may include and execute the user applications A (182) and B (188) through N (192).

In one or more embodiments, the user device A (180) is operated by a user that is a developer to fine-tune one of the pretrained language models (145) to generate one of the fine-tuned models (150). Responsive to the developer, the user device A (180) may interact with the server (140) to identify a model, make modifications to the model, identify a data set for fine tuning, and train the model.

In one or more embodiments, the user device N (190) is operated by a user to process information using one of the fine-tuned models (150). The user device N (190) may provide a prompt in the form of text that is converted to tokens and vectors that are input to one of the fine-tuned models (150). The corresponding output may be converted from vectors back to tokens and text that is sent to and displayed by the user device N (190).

Although described within the context of a client server environment with servers and user devices, aspects of the disclosure may be practiced with a single computing system and application. For example, a monolithic application may operate on a computing system to perform the same functions as one or more of the user application A (182), tokenizers (142), the pretrained language models (145), and the fine-tuned models (150).

Figure 2:
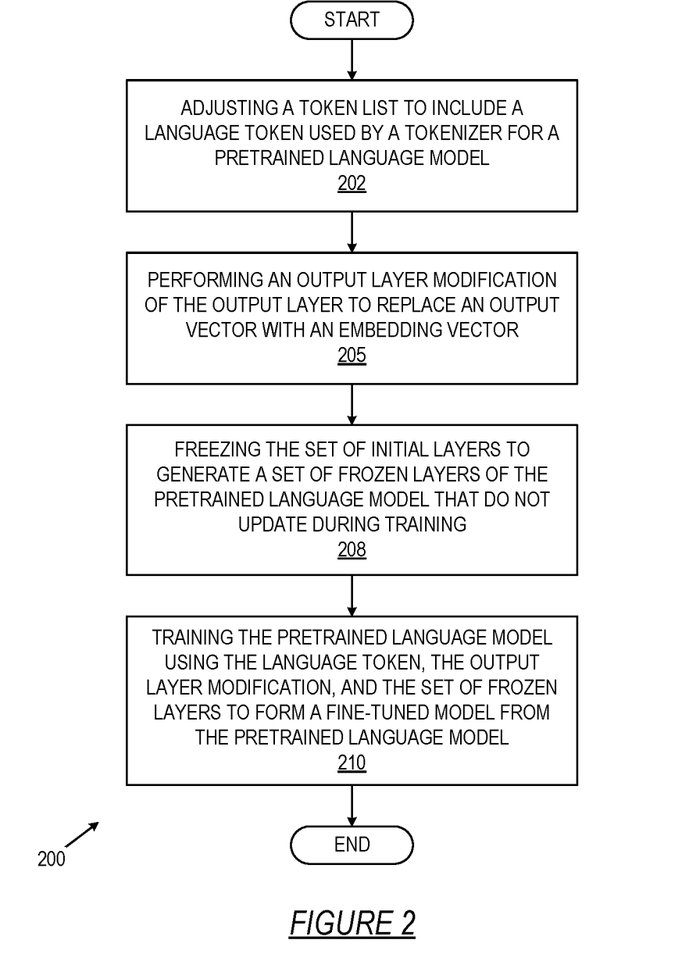
FIG. 2 shows a method in accordance with one or more embodiments of the disclosure.

Turning to FIG. 2, the process (200) updates a pretrained language model for machine learning tasks. The process (200) may be performed using components from the system (100) of FIG. 1. In one or more embodiments, the process (200) starts with a pretrained language model, updates various aspects of the pretrained language model, and generates a fine-tuned model.

Step 202 of the process (200) includes adjusting a token list to include a language token used by a tokenizer for a pretrained language model. In one or more embodiments, the pretrained language model comprises a set of layers. In one or more embodiments, the set of layers comprises a set of initial layers, an embedding layer, and an output layer. In one or more embodiments, the output layer generates an output vector from an embedding vector generated by the embedding layer. In one or more embodiments, the token list is adjusted by including language tokens for keywords and application programming interface (API) names of standard libraries for a programming language for which the pretrained language model may be fine-tuned.

Step 205 of the process (200) includes performing an output layer modification of the output layer to replace an output vector with an embedding vector. The output layer modification may form a skip layer in which certain ones of the embedding vectors are "skipped" to the output layer (bypassing the intermediate layers) to replace corresponding output vectors of an output sequence of the pretrained language model. In one or more embodiments, the embedding vectors that are "skipped" are embedding vectors that represent language tokens that correspond to keywords from a programming language.

Step 208 of the process (200) includes freezing the set of initial layers to generate a set of frozen layers of the pretrained language model that do not update during training. The layers that are not frozen continue to update. The frozen layers generate outputs, but updates to the weights and biases for the frozen layers are performed so that the frozen layers of the fine-tuned model have the same weights and biases as the frozen layers of the pretrained language model. The initial layers may be frozen to improve the accuracy achieved from fine-tuning the model.

Step 210 of the process (200) includes training the pretrained language model using the language token, the output layer modification, and the set of frozen layers. Training the pretrained language model using the language token, the output layer modification, and the set of frozen layers forms a fine-tuned model from the pretrained language model.

In one or more embodiments, the process (200) further includes processing an input text using the fine-tuned model to generate output text that is responsive to the input text. The input text may include a prompt that identifies a task. The output test includes words and sentences that perform the task from the input text. For example, types of tasks include code generation, code completion, code summarization, code translation, bug detection and debugging, documentation generation, natural language interfaces, code refactoring, code recommendation, code search and retrieval, code analysis, code generation from pseudocode, code plagiarism detection, code synthesis for domain-specific languages, automated testing, code anomaly detection, code migration, version control assistance, Code generation automatically generates code based on a given description or high-level requirements, which may include tasks like writing functions, classes, or entire programs. Code completion may include suggesting code completions during the typing of code by developers to save time and reduce coding errors. Code summarization may include summarizing lengthy sections of code or documentation. Code translation may include translating code from one programming language to another, which may be used to port software to different platforms or languages. Bug detection and debugging may include identifying and locating bugs in code by analyzing patterns and providing suggestions for fixes. Documentation generation may include automatic generation of documentation for code, including function and class descriptions, parameter details, and usage examples, which may be based on code provided as input to the pretrained language model. Natural language interfaces may include translating between application programming interfaces and natural language interfaces to interface with the application programming interfaces using natural language queries. Code refactoring may include suggesting improvements to code structure and style to enhance readability, maintainability, and performance. Code recommendation may include providing recommendations for libraries, frameworks, or best practices based on project requirements or coding patterns. Code search and retrieval may include searching for specific code snippets or solutions to common programming problems. Code analysis may include providing insights into code quality, security vulnerabilities, and compliance with coding standards. Code generation from pseudocode may include transforming pseudocode or plain English descriptions into functional code. Code plagiarism detection identifies instances of code plagiarism by comparing code fragments against a database of known code sources. Code synthesis for domain-specific languages generates code that adheres to specific domain-specific languages or constraints. Automated testing generates test cases and automates the testing process to improve software reliability. Code anomaly detection flags unusual code behavior or patterns that may indicate security threats or errors. Code migration facilitates the migration of legacy code to newer versions, technologies, platforms, etc. Version control assistance provides suggestions for managing version control systems and resolving merge conflicts.

In one or more embodiments, the language token corresponds to a keyword of a programming language. For example, keywords from the java language specification may be identified as language tokens used by the tokenizer for the pretrained language model.

In one or more embodiments, the language token corresponds to a name from an application programming interface of the programming language. For example, names for functions and variables of an application programming interface may be identified as language tokens used by the tokenizer for the pretrained language model.

In one or more embodiments, the language token corresponds to a name from a standard library of the programming language. For example, names for packages, classes, functions, variables, etc., from standard libraries for programming languages may be identified as language tokens used by the tokenizer for the pretrained language model.

In one or more embodiments, the process (200) further includes training the pretrained model with a set of training input tokens comprising one or more of a set of programming language tokens, a set of natural language tokens, and a set of syntax tree tokens. The set of programming language tokens includes tokens for programming language code. The set of natural language tokens includes tokens for natural language words that may be related to the programming language code in the programming language tokens (e.g., comments or pseudocode). The set of syntax tree tokens includes tokens for a syntax tree of the programming language code in the programming language tokens.

In one or more embodiments, the set of frozen layers includes a set of initial layers of the pretrained language model and does not include a set of end layers of the pretrained language model. The set of initial layers may include an input layer, may include an embedding layer, and may include intermediate layers within the machine learning model. The initial layers are in contrast to the end layers, which are not part of the initial layers. The set of end layers may include an output layer of the pretrained language model.

In one or more embodiments, the set of frozen layers includes the embedding layer. The embedded layer converts the tokens to vectors and may not be trained during the fine tuning of the pretrained language model.

In one or more embodiments, the set of frozen layers does not include the output layer. In one or more embodiments, the output layer may be the only Frozen layer in the set of frozen layers.

In one or more embodiments, fine tuning the pretrained language model by training the pretrained language model using the language token, the output layer adjustment, and the set of frozen layers may include additional steps of processing, comparing, and backpropagation. A training input vector may be processed using the pretrained language model to generate a training output vector. The training output vector is compared to an expected vector. A difference between the training output vector and the expected vector is backpropagated to a set of end layers of the pretrained language model to form the fine-tuned model.

Figure 3A:
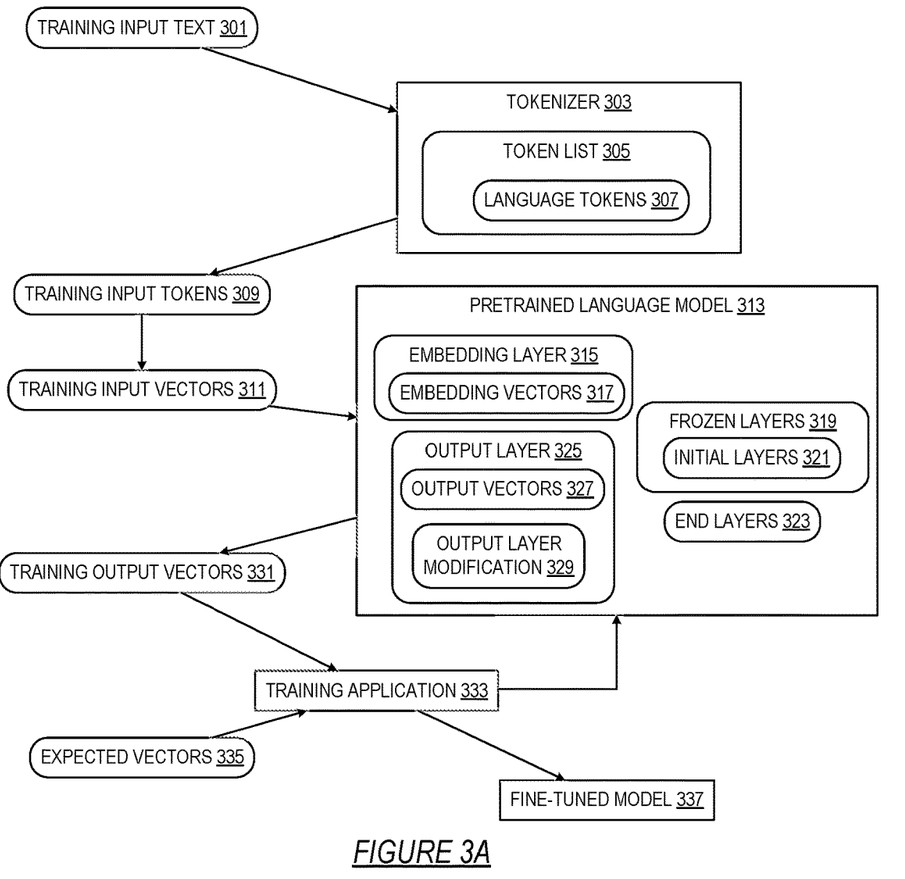
FIG. 3A, FIG. 3B, and FIG. 4 show examples in accordance with one or more embodiments of the disclosure.

Turning to FIG. 3A, administrator Alice wants to fine-tune the pretrained language model (313) for a programming language with keywords and names represented by the language tokens (307). In one or more embodiments, the pretrained language model (313) is a pretrained model. After the pretrained language model (313) is selected, the pretrained language model (313) is updated to include the output layer modification (329), to freeze the frozen layers (319), and to add the language tokens (307) to the token list (305) used by the tokenizer (303). After updating the pretrained language model (313) with the output layer modification (329), the frozen layers (319), and the language tokens (307), the pretrained language model (313) is further trained with a fine-tuned data set that includes text with programming code that corresponds to the language tokens (307).

The training input text (301) from the fine-tuned data set is entered to the tokenizer (303). The tokenizer (303) processes the training input text (301) to generate the training input tokens (309). The tokenizer (303) uses the token list (305) to extract the training input tokens (309) from the training input text (301). In one or more embodiments, the tokenizer (303) is modified from the tokenizer used to pretrain the pretrained language model (313). The tokenizer (303) is modified by adding the language tokens (307) to the token list (305).

The token list (305) is a list of tokens that enumerates the different unique tokens that may be extracted from input text, e.g., the training input text (301). The token list (305) is modified to include the language tokens (307).

The language tokens (307) are the tokens added to the token list (305) to modify the tokenizer (303) for fine tuning the pretrained language model (313). In one or more embodiments, the language tokens (307) include tokens corresponding to keywords and names of a programming language selected by administrator Alice.

The training input tokens (309) are the tokens output from the tokenizer (303) that correspond to the training input text (301). In one or more embodiments, a token is a unique scalar value that is assigned to a word, subword, or phrase from the training input text (301). The training input tokens (309) are converted to the training input vectors (311). In one or more embodiments, the training input vectors (311) are one hot vectors with a number of dimensions equal to the number of tokens in the token list (305) in which one of the dimensions has a value set to "1" and the remaining dimensions have values set to "0". Each dimension of a one hot vector corresponds to one of the tokens enumerated by the token list (305).

The training input vectors (311) are input to the pretrained language model (313). The pretrained language model (313) processes the training input vectors (311) with multiple layers to generate the training output vectors (331). The layers include the initial layers (321) and the end layers (323).

The initial layers (321) are the layers that initially process the training input vectors (311) to generate intermediate vectors that are then processed by the end layers (323). The initial layers (321) are frozen to become the frozen layers (319) during the training of the pretrained language model (313) after the pretrained language model (313) has been pretrained. The initial layers (321) include the embedding layer (315).

The embedding layer (315) processes the training input vectors (311) to generate the embedding vectors (317). The embedding vectors (317) has fewer dimensions than the training input vectors (311) that represent a semantic vector space. Points that are located more closely together in the semantic vector space have meanings that are more similar as compared to points that are located further away from each other in the semantic vector space.

The end layers (323) process the output of the initial layers (321) (which is the output of the frozen layers (319)) to generate the training output vectors (331). The end layers (323) include the output layer (325).

The output layer (325) generates the output vectors (327). When the output layer (325) is the only layer that is not frozen, the output layer (325) processes the output of the frozen layers (319) to generate the output vectors (327). After generating the output vectors (327), the output layer modification (329) replaces certain values within the output vectors (327) to form the training output vectors (331).

The output layer modification (329) skips values from the embedding vectors (317) to replace corresponding values in the output vectors (327). The output layer modification (329) identifies values in the embedding vectors (317) that correspond to the names and keywords of the language tokens (307). The output layer modification (329) may then use the values from the embedding vectors (317) that correspond to the names and keywords of the language tokens (307) to overwrite corresponding values in the output vectors (327).

For example, the word "class", which is a keyword that corresponds to one of the language tokens (307) appears in the training input text (301) and is converted into the fourth token of the training input tokens (309), which corresponds to the fourth one hot vector of the training input vectors (311). The fourth one hot vector of the training input vectors (311) corresponds to the fourth vector within the embedding vectors (317), which corresponds to the fourth vector within the output vector (327). The output layer modification (329) replaces the fourth vector within the output vector (327) that was generated by the output layer (325) with the fourth vector from the embedding vectors (317). Similar replacements are made for the other keywords and names for the programming language that are identified in the language tokens (307). Making the replacements of certain vectors of the output vectors (327) with corresponding vectors from the embedding vectors (317) forms the training output vectors (331).

The training output vectors (331) is input to the training application (333). The training application (333) compares the training output vectors (331) to the expected vectors (335) to identify the difference or error between the training output vectors (331) and the expected vectors (335). The difference is fed back into the weights and biases of the parameters of the pretrained language model (313) to further update the pretrained language model (313). After training the pretrained language model (313) with a fine-tuned training set of data, the output layer modification (329), the frozen layers (319), and using the language tokens (307), the fine-tuned model (337) is formed. After generating the fine-tuned model (337), administrator Alice may deploy the fine-tuned model (337) for use by users of the system.

Figure 3B:
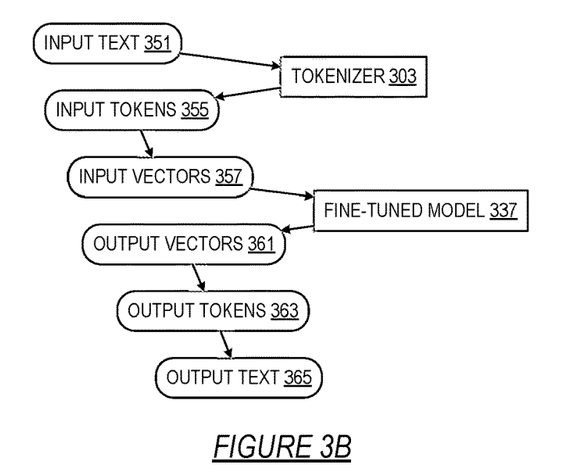

Turning to FIG. 3B, administrator Alice has deployed the fine-tuned model (337), which is being accessed by user Ulysses. User Ulysses uses a computing device to generate and send the input text (351) to the system.

The input text (351) is processed by the tokenizer (303) to generate the input tokens (355). The input tokens (355) are converted to the input vectors (357), which may be one hot vectors. The input vectors (357) are input to the fine-tuned model (337). The fine-tuned model (337) processes the input vectors (357) to generate the output vectors (361). The output vectors (361) are converted to the output tokens (363), which are converted to the output text (365). The output text (365) is transmitted back to the user device of user Ulysses, which displays the output text (365).

Figure 4:
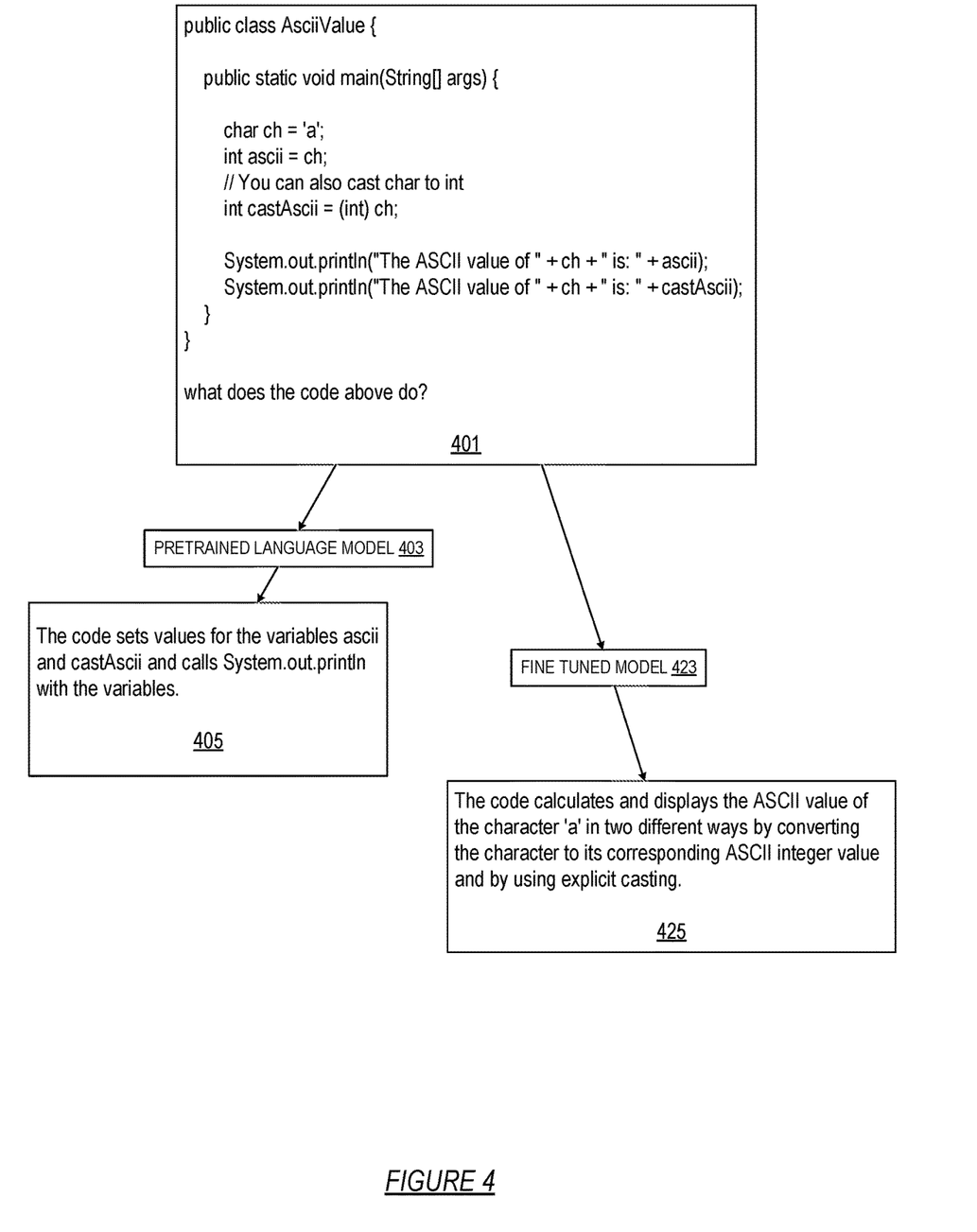

Turning to FIG. 4, administrator Alice has deployed both the pretrained language model (403) and the fine-tuned model (423). User Ulysses generates the input text (401), which is processed by both the pretrained language model (403) and the fine-tuned model (423). The pretrained language model (403) generates the output text (405) from the input text (401) and the fine-tuned model (423) generates the output text (425) from the input text (401).

The output text (405) from the pretrained language model (403) that has not been fine-tuned shows a superficial understanding of the code within the prompt of the input text (401). However, the output text (425) from the fine-tuned model (423) that has been fine-tuned shows a deeper understanding of the code within the prompt of the input text (401).

Figure 5A:
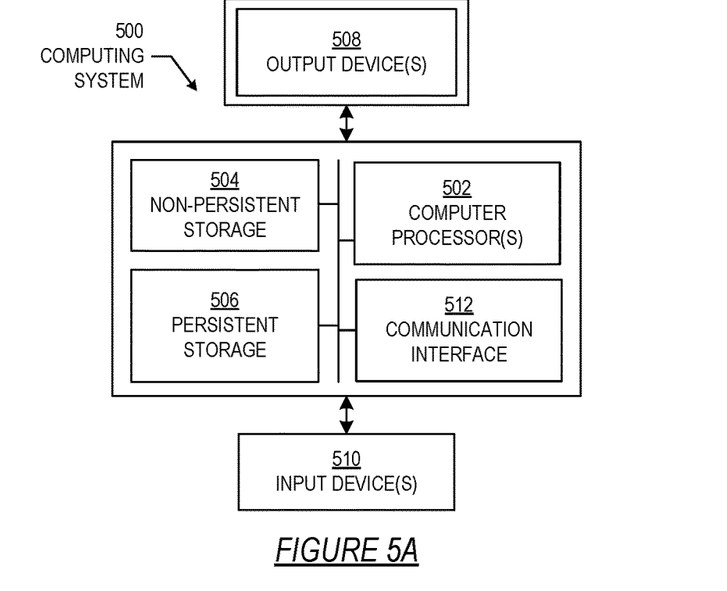
FIG. 5A and FIG. 5B show a computing system and network environment, in accordance with one or more embodiments of the disclosure.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage device(s) (504), persistent storage device(s) (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing units (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (508). The inputs may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 5B:
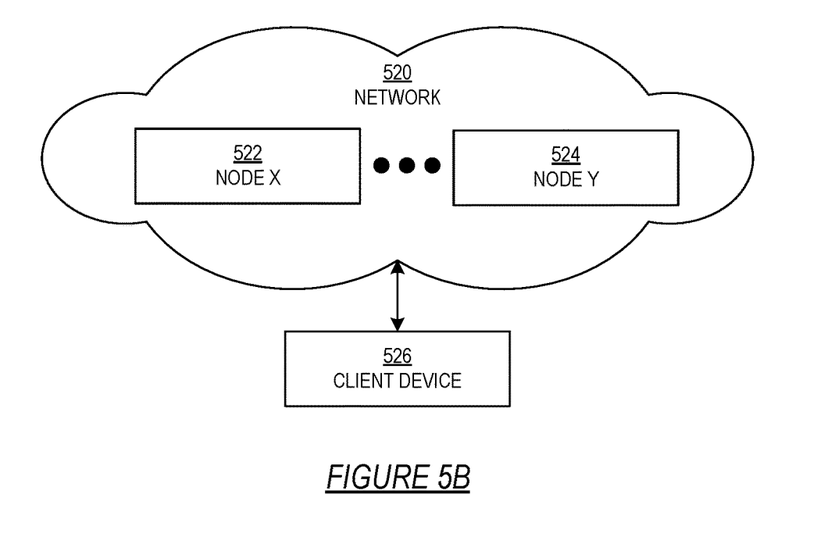

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the word "or" is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
adjusting a token list to include a language token used by a tokenizer for a pretrained language model,
   wherein the pretrained language model comprises a set of layers,
   wherein the set of layers comprises a set of initial layers, an embedding layer, and an output layer, and
   wherein the output layer generates an output vector from an embedding vector generated by the embedding layer;
performing an output layer modification of the output layer to replace the output vector with the embedding vector;
freezing the set of initial layers to generate a set of frozen layers of the pretrained language model that do not update during training; and
training the pretrained language model using the language token, the output layer modification, and the set of frozen layers to form a fine-tuned model from the pretrained language model, wherein training the pretrained language model comprises backpropagating a difference between a training output vector and an expected vector to a set of end layers of the pretrained language model to form the fine-tuned model.

2. The method of claim 1, further comprising:
processing an input text using the fine-tuned model to generate an output text that is responsive to the input text.

3. The method of claim 1, wherein the language token corresponds to a keyword of a programming language.

4. The method of claim 1, wherein the language token corresponds to a name from an application programming interface of a programming language.

5. The method of claim 1, wherein the language token corresponds to a name from a standard library of a programming language.

6. The method of claim 1, further comprising:
training the pretrained language model with a set of training input tokens comprising one or more of a set of programming language tokens, a set of natural language tokens, and a set of syntax tree tokens.

7. The method of claim 1, wherein the set of frozen layers includes the set of initial layers and does not include a set of end layers of the pretrained language model.

8. The method of claim 1, wherein the set of frozen layers includes the embedding layer.

9. The method of claim 1, wherein the set of frozen layers does not include the output layer.

10. The method of claim 1, wherein training the pretrained language model using the language token, the output layer modification, and the set of frozen layers comprises:
processing a training input vector using the pretrained language model to generate the training output vector; and
comparing the training output vector to the expected vector.

11. A system comprising:
at least one processor;
an application executing on the at least one processor to perform:
adjusting a token list to include a language token used by a tokenizer for a pretrained language model,
   wherein the pretrained language model comprises a set of layers,
   wherein the set of layers comprises a set of initial layers, an embedding layer, and an output layer, and
   wherein the output layer generates an output vector from an embedding vector generated by the embedding layer;
performing an output layer modification of the output layer to replace the output vector with the embedding vector;
freezing the set of initial layers to generate a set of frozen layers of the pretrained language model that do not update during training; and
training the pretrained language model using the language token, the output layer modification, and the set of frozen layers to form a fine-tuned model from the pretrained language model, wherein training the pretrained language model comprises backpropagating a difference between a training output vector and an expected vector to a set of end layers of the pretrained language model to form the fine-tuned model.

12. The system of claim 11, wherein the application is further configured to perform:
processing an input text using the fine-tuned model to generate an output text that is responsive to the input text.

13. The system of claim 11, wherein the language token corresponds to a keyword of a programming language.

14. The system of claim 11, wherein the language token corresponds to a name from an application programming interface of a programming language.

15. The system of claim 11, wherein the language token corresponds to a name from a standard library of a programming language.

16. The system of claim 11, wherein the application is further configured to perform:
   training the pretrained language model with a set of training input tokens comprising one or more of a set of programming language tokens, a set of natural language tokens, and a set of syntax tree tokens.

17. The system of claim 11, wherein the set of frozen layers includes the set of initial layers and does not include a set of end layers of the pretrained language model.

18. The system of claim 11, wherein the set of frozen layers includes the embedding layer.

19. The system of claim 11, wherein the set of frozen layers does not include the output layer.

20. A non-transitory computer readable storage medium storing computer readable program code which, when executed by a processor, performs:

adjusting a token list to include a language token used by a tokenizer for a pretrained language model,
   wherein the pretrained language model comprises a set of layers,
   wherein the set of layers comprises a set of initial layers, an embedding layer, and an output layer, and
   wherein the output layer generates an output vector from an embedding vector generated by the embedding layer;

performing an output layer modification of the output layer to replace the output vector with the embedding vector;

freezing the set of initial layers to generate a set of frozen layers of the pretrained language model that do not update during training; and training the pretrained language model using the language token, the output layer modification, and the set of frozen layers to form a fine-tuned model from the pretrained language model, wherein training the pretrained language model comprises backpropagating a difference between a training output vector and an expected vector to a set of end layers of the pretrained language model to form the fine-tuned model.

\* \* \* \* \*